Figure 1:
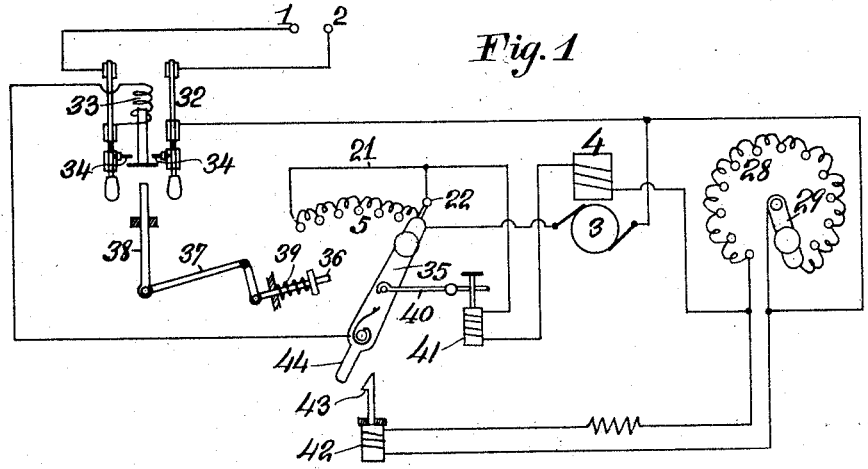

H. W. LEONARD.
ELECTRIC MOTOR CONTROLLING APPARATUS.
APPLICATION FILED MAY 11, 1909.

981,579.

Patented Jan. 10, 1911.

2 SHEETS—SHEET 1.

Witnesses
M. E. Moore
Thomas Howe

Inventor
H. Ward Leonard,
By his Attorneys
Edwards, Sager & Wooster.

H. W. LEONARD.
ELECTRIC MOTOR CONTROLLING APPARATUS.
APPLICATION FILED MAY 11, 1909.

981,579.

Patented Jan. 10, 1911.

2 SHEETS—SHEET 2.

Witnesses
M. E. Moore.
Thomas Howe

Inventor
H. Ward Leonard,
By his Attorneys
Edwards, Sager & Wooster.

UNITED STATES PATENT OFFICE.

HARRY WARD LEONARD, OF BRONXVILLE, NEW YORK.

ELECTRIC-MOTOR-CONTROLLING APPARATUS.

981,579. Specification of Letters Patent. Patented Jan. 10, 1911.

Original application filed January 23, 1905, Serial No. 242,203. Renewed February 20, 1907, Serial No. 358,417. Divided and this application filed May 11, 1909. Serial No. 495,358.

*To all whom it may concern:*

Be it known that I, HARRY WARD LEONARD, a citizen of the United States, residing at Bronxville, in the county of Westchester and State of New York, have invented certain new and useful Improvements in Electric-Motor-Controlling Apparatus, of which the following is a full, clear, and exact specification.

This invention relates to electric motors, and particularly to the provision of means which will insure the proper operation of controlling devices therefor.

This application is a division of my pending application filed January 23, 1905, Serial No. 242,203, renewed February 20, 1907, Serial No. 358,417.

By my invention I provide controlling means for each element of the motor and the controlling means of one element are functionally related to those of the other so that they are necessarily operated in a proper manner. I therefore protect the motor and other portions of its circuit from the objectionable or injurious effects due to improperly starting up or operating a motor when the strength of its field is less than a desirable amount. I also provide suitable protective devices which will respond to protect the motor under abnormal conditions, all of which coöperate to secure freedom to the motor from any harmful effects.

My invention may be embodied in various arrangements and forms of construction, some of which are shown in the accompanying drawings, and the form illustrated in each figure comprises my invention and represents one specific embodiment thereof.

Figures 1 to 6 of the drawings are diagrammatic views illustrating preferred forms of my invention, each showing a modification different from that shown in the other views.

Similar parts are indicated by the same reference character in each of the figures.

Referring to Fig. 1, the supply terminals of a constant electromotive force circuit are indicated at 1, 2, the motor armature at 3, and the motor field at 4. A starting resistance 5 is shown connected in the armature circuit and a resistance for varying the field strength is indicated at 28. The mains from the supply terminals 1, 2 pass to the double pole circuit breaker 32, one line including the overload coil 33. The core of the latter trips the latches indicated at 34 upon its upward movement, due to overload, whereupon the spring pressed switches are forced outward and open the main circuit. The arm 35 of the starting rheostat is spring pressed, tending to return it to the starting position. This arm does not open the circuit at the rheostat, but at its initial position strikes the rod 36 which will open the circuit breaker 32 by raising the core of coil 33 by means of the lever 37 and rod 38. The rod 36 is normally forced into the path of arm 35 either by a spring as 39 or through gravity. The arm 35 is held in its final position by a latch 40. This may be tripped by the fall of a core 41 which is held up during operation by its coil which is shown in series with the field 4. This coil therefore acts as a no-voltage release.

In order to prevent improper starting, I provide a locking device for the arm 35. This is shown as a solenoid 42, the plunger of which carries a catch 43 having one of its faces inclined. The coil of the solenoid may have a resistance in series with it and is connected between the arm 29 of the field rheostat 28 and the initial contact of the rheostat. The excitation of coil 42 will consequently depend upon the drop in volts upon the field resistance which is dependent upon the position of arm 29. When the drop in volts is a predetermined amount, the core of solenoid 42 is raised and the catch 43 projects into the path of an extension 44 on arm 35 permitting the extension to ride over the inclined face in one direction, but afterward locking the arm from movement in the opposite direction.

Upon opening the main circuit or upon the occurrence of no-voltage, the arm 35 will be released by the action of core 41 and its spring will force the arm to its initial position and the blow on rod 36 will open the circuit breaker 32 as above explained. There is sufficient lost motion of the parts so that the core of coil 33 is not raised by rod 38 when the arm 35 is at rest in its initial position on the first contact. If, upon again starting, an excessive resistance is in the field, the closing of the main circuit will cause the catch 43 to be raised and prevent the arm 35 from cutting out the armature resistance until the operator has first cut out the field resistance when the catch 43 will fall. This figure shows running conditions and with all the field resistance cut in.

Figure 2:
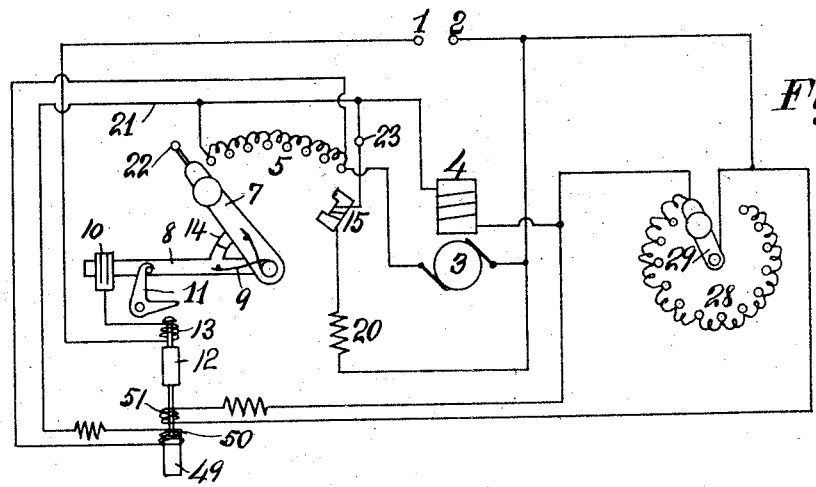

In Fig. 2 the starting rheostat is in this instance provided with two arms 7, 8, pressed toward each other by a spring 9. The arm 8 serves as a main overload switch and normally engages a fixed contact 10, being retained in position by a catch 11. The latter is adapted to be thrown by the upward movement of core 12 when an abnormal current flows through its coil 13. The coil 13 is connected in the main circuit from 1 to contact 10. The arm 7 is shown in the off position and in this position closes the switch or arm 8, as for example, by engagement of an abutment 14. A no-voltage or low voltage magnet 15 is provided for holding the arm 7 when all starting resistance is cut out. When the current supply is interrupted, or a very low voltage occurs, the magnet 15 is deënergized, or its strength reduced, the arm 7 returning to the off position by pressure of spring 9. The field resistance 28 is controlled by the freely movable arm 29. The plunger 12 of the overload device is provided in this case with an additional core 49 on which two coils, 50 and 51, tend to act. Coil 50 is connected around the resistance 5, or if desired may include only a portion thereof. Coil 51 is connected from the initial contact of the field resistance to the arm 29. Coil 50 will therefore be subjected to the drop in volts which occurs upon the starting resistance and coil 51 to that which occurs upon the field resistance. When current passes in only one of these coils, it is insufficient to raise the plunger, but when the current passing in one is aided by a current passing in the other, the plunger will be raised and trip the latch 11, which will cause the main circuit to be opened. If upon closing the main circuit in starting by means of arm 7, any appreciable amount of field resistance is cut in, the current in the two coils 50 and 51 will co-act to raise the plunger and the arm 8 will be thrown to open the circuit. Before starting again, the operator will move arm 29 to cut out the field resistance and the motor will then be started under full field strength. After the starting resistance is cut out and the motor is up to speed, the arm 29 may be manipulated to vary the field resistance as desired. Increasing the field resistance will not then trip the latch 11, although a current will flow in coil 51, since there will then be no current in coil 50.

Figure 3:
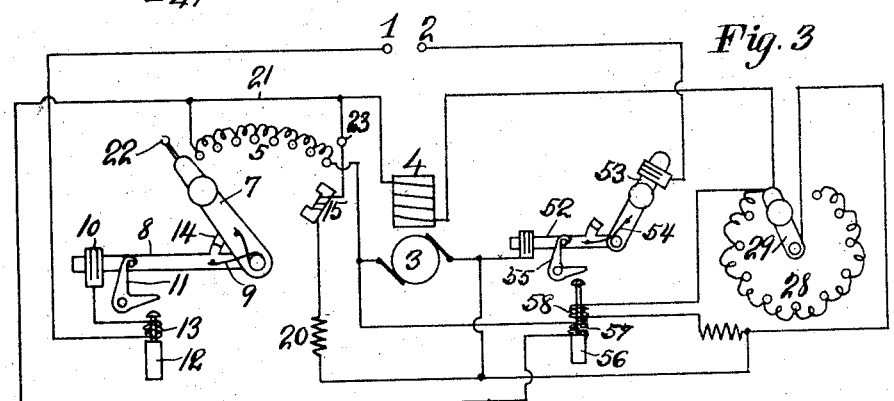

In Fig. 3 I also illustrate a starting rheostat and overload device. In this case I show an auxiliary switch in the main circuit comprising two pivoted arms 52, 53 pressed toward each other by a spring 54. The arm 53 is manually operated and engages a contact which holds it in position by friction. The arm 52 is forced to engage its contact by movement of arm 53 against an abutment on arm 52. A latch 55 will hold the arm 52 in engagement with its contact and is adapted to be tripped by the upward movement of the plunger 56. When current flows in either coil 57 or 58 the plunger will not be raised, but when the current flows in both of the coils they act accumulatively and raise the plunger to trip latch 55, permitting the arm 52 to be opened. The coil 57 is connected across the armature resistance 5 and the coil 58 is connected so as to be subjected to the volts dropped on the field resistance. Hence, upon starting, this switch will be opened unless the field resistance is cut out and it will be necessary to move the arm 29 to the initial contact before the motor can be speeded up.

Figure 4:
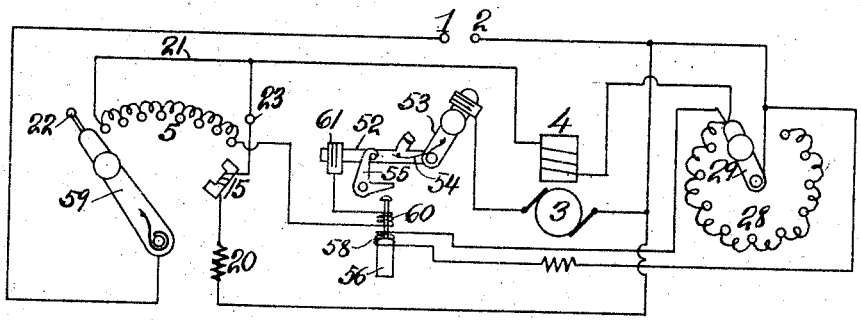

In Fig. 4 I have shown the starting rheostat as provided with a spring pressed arm 59 adapted to be held in its final position by the no-voltage magnet 15. In the main circuit is inserted the switch having the two pivoted arms 52, 53 pressed toward each other by the spring 54 and having the latch 55 as explained with reference to Fig. 3. The plunger 56 is provided with a coil 58 connected as in Fig. 3 to the field rheostat and the coil 60 is connected in the main circuit between the resistance 5 and the contact 61. The coil 60 will therefore act as an overload coil and trip the latch 55 upon the occurrence of an abnormal current. When starting, the arm 52 is made to engage contact 61 by means of arm 53 and then arm 53 is moved to engage its contact. The main circuit is closed by moving the arm 59 to the initial contact and if an undersirable amount of resistance is in the field circuit, the current which will flow in coil 58 will act with the current in coil 60 to raise the plunger and open the main circuit. Before again attempting to start, the field resistance must be cut. With this arrangement it is impossible to take under running conditions, as large a current when the field is weak as may be taken when the field is strong. This is desirable on account of the objectionable sparking which is likely to occur when a large load is carried on a weak field.

Figure 5:
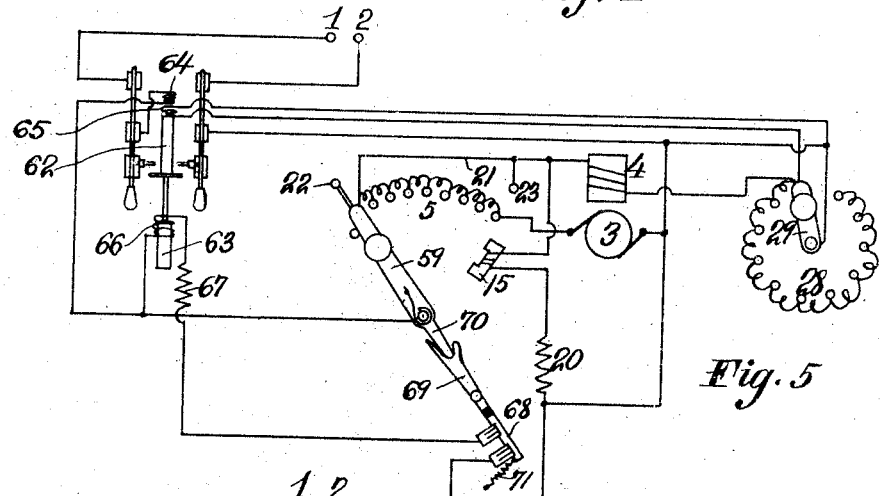

In Fig. 5 I show a double pole circuit breaker and the spring pressed arm 59 of the starting rheostat has no open position. The plunger of the circuit breaker is provided with two cores 62, 63, preferably rigidly connected. The core 62 is provided with two coils 64, 65, the coil 64 being connected in the main circuit and the coil 65 to the initial contact of the field rheostat and to the arm 29. The coils act accumulatively to raise the core 62. The coil 66 acts to raise the core 63 and is connected across the line through a resistance 67 and a switch 68. The blade of the latter is carried by a pivoted lever 69 which is engaged by an extension 70 on the arm 59. When the arm 59 is moved from its initial position it opens the switch 68 against the pressure of a spring 71. When the switch 68 is closed, the current passing in coil 66 will be sufficient to raise the plunger and open the circuit breaker. This coil will therefore protect the armature resistance and other parts of the circuit against damage which might result from leaving arm 59 in the initial position for an unusual time. This condition might arise upon failure of current for a brief interval, causing the arm to return to its initial position and then subjecting the resistance to the current when restored. The same condition might arise if the circuit of magnet 15 alone were accidentally interrupted. The opening of the circuit breaker by coil 66 therefore avoids such a condition. When an abnormal current passes in coil 64 the circuit breaker will be opened in the usual manner. If in starting, there is resistance in the field, the current in coil 65 will coöperate with that in 64 and open the circuit breaker and necessitate cutting out the field resistance. In this arrangement, as in Fig. 4, a less overload current is permissible when the field is weak than when the field is strong. In starting, the field rheostat should be moved to short-circuit position and the arm 59 should then be moved slightly until the switch 68 is opened, then while holding the arm 59, the two arms of the double pole circuit breaker should be closed successively.

Figure 6:
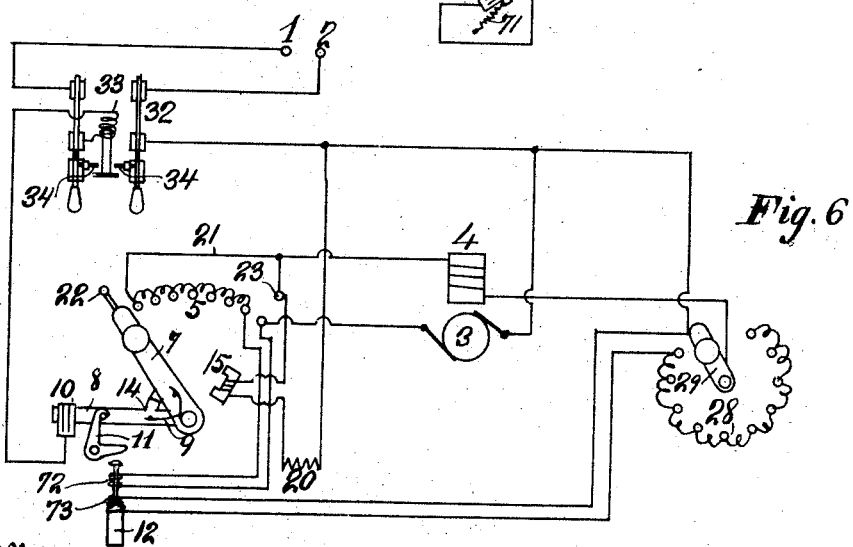

In Fig. 6, I provide the starting rheostat having the two spring pressed arms 7, 8, with the latch 11 for the arm 8 and the no-voltage magnet 15 for arm 7. An overload double pole circuit breaker 32 is connected in the main circuit. In this case the plunger 12 for tripping the latch 11 is provided with two coils 72, 73 which act accumulatively. The coil 72 is connected in series with the starting resistance 5 between the last two contacts in place of a resistance step. The coil 73 is connected in series with the field resistance 28 and between the first two contacts in place of a resistance step. The starting current passing through coil 72 is not sufficient to raise the plunger 12 but when assisted by the field current will be raised and the arm 8 released. In starting, the arm 7 is moved to off position shown in the drawing, closing arm 8 and the two sides of the circuit breaker 32 are then closed successively. The arm 7 is then moved to the first contact of the starting resistance. If any resistance is in the field circuit, the latch 11 will be tripped, since the plunger 12 is acted upon by both the field and the armature current in coils 72, 73. The arm 29 must therefore be returned to the initial contact of the field rheostat before the motor can be started. When the starting arm 7 is moved to the final contact after properly starting, the coil 72 will be cut out of circuit and the field rheostat may be varied as desired, the current in coil 73 alone not being sufficient to raise the plunger. The circuit breaker 32 may be set to higher amperes than the coil 72, permitting large motors to be started on friction or light loads by means of a small starter and the motor may afterward be heavily loaded and varied in speed by means of the field rheostat. This arrangement will be desirable for very large motors which receive heavy overloads after being started.

Many other modifications of my invention may be developed and various changes in the connections may be made and accomplish substantially the same results.

It will be understood that instead of using a starting rheostat contact switch, I may, in some cases, omit the starting resistance and use a plain switch. I may sometimes use a controlling armature resistance for varying the speed, in which case the arm of the rheostat would be freely movable and remain in any position placed.

It is not necessary in those cases where I provide a coil which is subjected to the drop in volts on the field rheostat, as in Figs. 1, 2, 3, 4 and 5, to connect one end of the coil to the controlling arm of the rheostat as shown, as the same result will be obtained by connecting to the final contact of the rheostat or to some intermediate contact. Also, although I have indicated resistances in the circuits of some of the coils which act automatically to cause a circuit to be opened, it will be understood that in some cases they may not be necessary and may be made adjustable if desired to change the volts dropped in them.

As my invention is susceptible of a variety of embodiments, all within the scope and spirit thereof, I do not wish or intend to limit the same to the specific constructions herein described, or otherwise than as expressed in the following claims.

Having thus described my invention, I declare that what I claim as new and desire to secure by Letters Patent, is:—

1. The combination of an electric motor, a resistance for controlling the armature circuit of the motor, a resistance for controlling the field strength of the motor, and means for insuring starting of the motor only with a field of proper strength, said means comprising an electro-responsive winding connected across said field resistance.

2. The combination of a shunt wound motor, a starting armature resistance, a variable field resistance, and electro-responsive means comprising a winding in series with the shunt field winding and in parallel with said field resistance for preventing the starting up of the motor when the field is in a weakened condition.

3. A dynamo electric machine having a field winding, a field controlling resistance in series therewith, a magnetic winding connected across the terminals of said resistance, and means controlled by said latter winding and controlling said field winding.

4. The combination of an electric motor, a field rheostat for varying the speed of the motor upon a constant electromotive force circuit, and electrically controlled means for preventing starting up of the motor under a condition of weakened field, said means comprising a controlling winding subjected to the voltage across said field rheostat.

5. The combination with a motor, of a resistance for weakening the field strength of the motor for the purpose of increasing its speed, and electrical means for preventing the starting up of the motor when the field is in a weakened condition, said means comprising a magnetic winding subjected to the voltage across said resistance, and a magnetic element movable in response to an increase of the magnetic strength of said winding.

6. The combination with a motor having a shunt field winding, of a rheostat for said field winding, a starting rheostat, means tending to move the contact arm thereof toward the initial position, means for holding said arm and which is responsive to release said arm when the supply voltage falls below a certain amount, and means electrically controlled for preventing the starting of the motor when the field is in a weakened condition, said latter means comprising a winding in series with said shunt field winding.

7. The combination of a motor, a starting switch, a field rheostat, and electrical means for preventing the starting of the motor except when the field has a predetermined strength, said means comprising a winding in shunt with said field rheostat.

8. The combination with an electric motor, of an armature resistance, a switch controlling the motor armature circuit, means for varying the field strength, a no-voltage protective device, an overload protective device, and electrical means for preventing the starting up of the motor when the field is in a weakened condition, said means comprising a magnetic winding controlling the movement of said switch.

9. The combination of an electric motor, two independently closable switches in series with each other and with the armature of the motor, means for causing the automatic opening of said switches upon overload, a resistance device having a spring actuated resistance controlling movable element in series in said circuit, a no-voltage device for controlling said movable element, means dependent upon the movement of said element for causing the opening of at least one of said two switches to protect the circuit, means for varying the field strength of the motor, and means dependent upon said field varying means for insuring that the field of the motor will be of proper strength when the said resistance is cut out to start the motor.

10. The combination of an electric motor, a resistance controlling the armature circuit and having a movable element automatically movable in response to no-voltage, a switch in series therewith, means for causing the automatic opening of said switch in response to overload and in response to movement of said movable element, a field varying resistance of the motor, and electrical means correlating said field resistance and said armature controlling resistance.

11. The combination of an electric motor, an armature controlling resistance having a movable element, a field controlling resistance, and electro-responsive means for preventing the movement of said element to cut out the armature resistance except when the field has proper strength.

12. The combination with an electric motor, of an armature rheostat, means for varying the field strength, a no-voltage protective device, an overload protective device, and electrical means for preventing the removal of the armature resistance from circuit when the field is in a weakened condition.

13. The combination with an electric motor, of a resistance in the armature circuit thereof, means for removing said resistance from said circuit, a resistance for the field circuit of the motor, and a circuit in shunt to said field resistance and containing an electro-responsive winding, said electroresponsive winding acting to insure the starting of the motor only under predetermined conditions of the field strength.

14. The combination with a motor field rheostat adapted to weaken the field of the motor, of an electroresponsive means in parallel with the resistance of said rheostat which is in circuit, and means controlled by said winding for protectively controlling the condition of the motor field when the motor is started.

15. The combination with a motor field winding, of a resistance in series therewith, an electro-responsive device in parallel with said resistance whereby the current of said electro-responsive device is dependent upon the amount of said resistance which is in series with said field winding, and means controlled by said electro-responsive device for insuring the starting of the motor with a proper field strength.

16. The combination with an electric motor, of a field resistance in series with the field winding, and motor protective means comprising a magnetic winding in series with the field winding and in shunt with said field resistance.

17. The combination of a shunt wound motor, an armature resistance having a movable controlling element, a locking device for said element adapted to prevent the movement of the same under certain conditions, and electrical means for controlling said locking device, said means being dependent upon the condition of the shunt field circuit of the motor.

18. The combination of a shunt wound motor, a magnetic winding functionally related to the shunt field winding of the motor, an automatically movable element controlled by said magnetic winding and movable in response to a condition of the shunt field circuit, and means controlled by said movable element for protecting the motor against abnormal operation.

In testimony whereof I affix my signature, in presence of two witnesses.

H. WARD LEONARD.

Witnesses:
C. J. CORNELL,
GEO. J. SCHELZ, Jr.